Oct. 24, 1933.     H. HEIN     1,931,820
METHOD AND APPARATUS FOR HAULING AIRCRAFT UPON WATERCRAFT
Filed Feb. 10, 1932
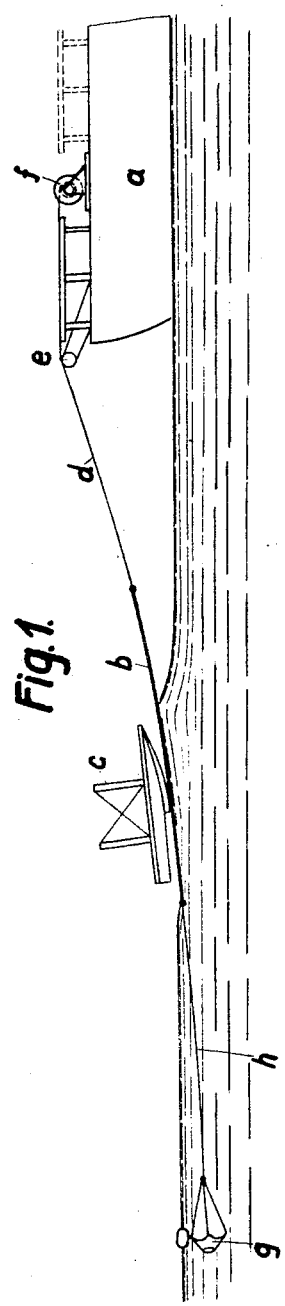
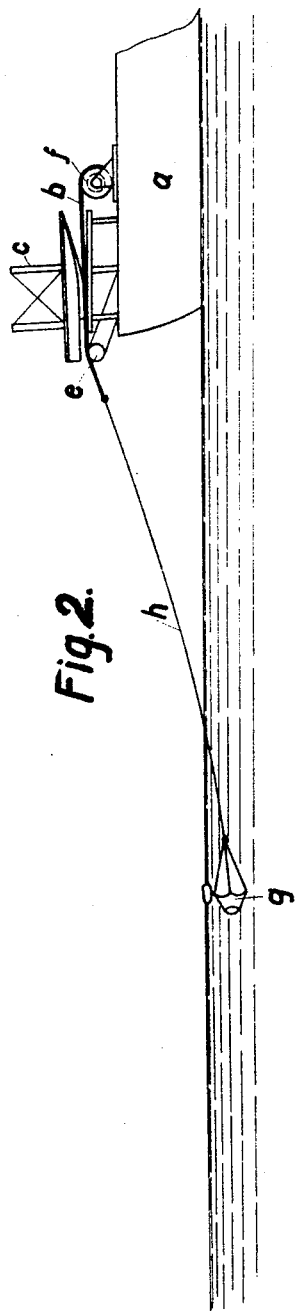
Inventor:
Hermann Hein
By
Attorney

UNITED STATES PATENT OFFICE 1,931,820

METHOD AND APPARATUS FOR HAULING AIRCRAFT UPON WATERCRAFT

Hermann Hein, Bremen, Germany

Application February 10, 1932, Serial No. 592,124, and in Germany March 18, 1931

4 Claims. (Cl. 114—0.5)

Hitherto aircraft have either been lifted from the water directly on board ship by a crane, or the aircraft was first set upon a buoyant intermediate element, from which it was lifted by a crane. When a landing sail was used the aircraft was drawn up the incline thereof, on board. With the motion of the sea these known methods present great difficulties; in lifting with a crane the attaching of the crane hook can endanger the aircraft; the hauling on board along a landing sail involves the interposition beneath the floats of the aircraft of a sledge, which can only be effected with difficulty. Apart from the fact that with these methods an extremely great resistance to motion must be overcome, the whole apparatus is very inadequate and difficult to operate.

The present invention provides a hauling up method which overcomes the disadvantages above pointed out. It consists in the aircraft after descent upon a floating carrying element, for example a landing sail, being secured to the latter and then being hauled up on the deck of the ship together with the supporting element as by means of an inclined hoist or a band conveyor. The necessary inclined position of the conveying device is produced and maintained by resistance bodies towed from its rear.

An example of the hauling apparatus is illustrated in the accompanying drawing, in which Figure 1 is a diagrammatic side view showing the various elements of the invention together with an aircraft and a watercraft, and Figure 2 is a similar view with the various parts in a different position. A landing sail $b$ is towed from a watercraft $a$. $c$ is the aircraft which has landed on this sail (Figure 1). The sail is drawn by tow ropes $d$ which are led over a guide roller $e$ to a winch $f$. When the aircraft is to be hauled up on board the ship, it is secured to the landing sail by lashing. Further, one or more resistance bodies $g$ are thrown into the water. As soon as these bodies have put the connecting ropes $h$ into tension through the motion of the ship, the winch $f$ is set in action and the attached aircraft is hauled up by this arrangement acting in the manner of a band conveyor, and, after it has passed the guide roller $e$, can remain supported between the roller and the winch, or can be moved further forward beyond the winch. The distance of the resistance bodies from the aircraft is made such that they maintain the sail $b$ in tension and at the necessary inclination for hauling up, until the aircraft has passed the guide roller $e$. This last stage is shown in Figure 2. It is perfectly clear from the drawing that the ropes $h$ are fixedly secured to the ends of the landing sail $b$.

Once the aircraft is secured it can be left by its occupants. The up and down movements of the sea have no influence on the security of operation of the hauling apparatus. The aircraft once secured comes with certainty on deck. In the method above described it is unimportant whether the aircraft is a sea plane or a land plane, for the latter kind can also land on a sail of suitable length and can be hauled up on deck as described.

I claim:

1. A device for hauling aircraft upon watercraft comprising, a landing sail adapted to be run out from the end of the watercraft to the water, and means in the water fixedly secured to and spaced at a distance behind said sail for maintaining it under tension while the sail is hauled on deck with the aircraft thereon.

2. A device for hauling aircraft upon watercraft comprising, a landing sail adapted to be run out from the end of the watercraft to the water, and a resistance body in the water at a considerable distance behind said sail and fixedly secured thereto for maintaining the sail under tension while it is hauled on deck with the aircraft thereon.

3. A device for hauling aircraft upon watercraft comprising, a landing sail, tow ropes for said sail, and a resistance body in the water at a considerable distance behind said sail and fixedly secured thereto by a rope and adapted to maintain the sail under tension while the sail is hauled on deck with the air craft thereon.

4. A device for hauling aircraft upon watercraft comprising, a landing sail, tow ropes for said sail, a resistance body in the water at a considerable distance behind said sail and fixedly secured thereto by a rope and adapted to maintain the sail under tension while the sail is hauled on deck with the aircraft thereon, and means on the watercraft for hauling the sail thereon.

HERMANN HEIN.